(12) United States Patent
Borkowski

(10) Patent No.: US 11,242,291 B1
(45) Date of Patent: Feb. 8, 2022

(54) BRINE WASTE MANAGEMENT METHOD UTILIZING GENETICALLY MODIFIED HALOPHILES AS BIO-REFINERIES

(71) Applicant: Steven Andrew Borkowski, Tampa, FL (US)

(72) Inventor: Steven Andrew Borkowski, Tampa, FL (US)

( * ) Notice: Subject to any disclaimer, the term of this patent is extended or adjusted under 35 U.S.C. 154(b) by 0 days.

(21) Appl. No.: 17/344,941

(22) Filed: Jun. 10, 2021

(51) Int. Cl.
| | |
|---|---|
| C05F 7/00 | (2006.01) |
| C05F 17/40 | (2020.01) |
| C05F 17/20 | (2020.01) |
| C02F 9/00 | (2006.01) |
| C02F 3/34 | (2006.01) |
| C02F 3/28 | (2006.01) |
| C02F 1/38 | (2006.01) |
| C02F 1/68 | (2006.01) |
| C02F 103/08 | (2006.01) |
| C02F 101/12 | (2006.01) |

(52) U.S. Cl.
CPC .............. C05F 7/005 (2013.01); C02F 3/34 (2013.01); C02F 9/00 (2013.01); C05F 17/20 (2020.01); C05F 17/40 (2020.01); C02F 1/385 (2013.01); C02F 1/68 (2013.01); C02F 3/28 (2013.01); C02F 2101/12 (2013.01); C02F 2103/08 (2013.01)

(58) Field of Classification Search
CPC .......... C05F 7/005; C05F 17/40; C05F 17/20; C02F 3/34; C02F 9/00; C02F 2103/08; C02F 2101/12; C02F 1/385; C02F 3/28; C02F 1/68
USPC .................. 71/8; 210/601, 610, 611, 631
See application file for complete search history.

(56) References Cited

U.S. PATENT DOCUMENTS

2012/0325740 A1* 12/2012 Kruglick .................. C02F 3/34 210/615

OTHER PUBLICATIONS

Aziz, Hanafiah, "Application of life cycle assessment for desalination: Progress, challenges and future directions", Environmental Pollution.
Araya, Gouveia, Nobre, Reis, Chamy, Poirrier, "Evaluation of the simultaneous production of lutein and lipids using a vertical alveolar panel bioreactor for three *Chlorella* species", Algal Research, Jul. 2014.
Bhattacharjee, Gohil, Singh, "Synthetic biology approaches for Bioremediation" Bioremediation of Pollutants, India.
Bhattacharjee, Gohil, Vaidh, Joshi, Vishwakarma, Singh, "Microbial bioremediation of industrial effluents and pesticides" Bioremediation of Pollutants, India.

(Continued)

*Primary Examiner* — Fred Prince

(57) ABSTRACT

A brine waste management method comprising the utilization of brine waste as a growth medium for cultures of genetically modified halophiles acting as bio-refineries creating chemicals of value. Brine waste enters the method (101) to undergo compositional analysis (102), Pretreatment (104), and Inoculation (106). The compositional analysis (102) and the selection (103) of the chemicals of value influences the selection (103) of the halophile species to undergo modification (105), as well as the pretreatment (104) needed to encourage growth-production (107). Growth-production (107) is monitored and assisted until the extraction (108) of the chemicals of value and additional post-extraction (109) handling of excess brine waste exiting the method.

18 Claims, 1 Drawing Sheet

(56) References Cited

OTHER PUBLICATIONS

D'Este, Alvarado-Morales, Angelidaki, "Laminaria digitata as potential carbon source in heterotrophic microalgae cultivation for the production of fish feed supplement", Algal Research, (2017).
Jones, Qadir ,Vliet, Smakhtin, Kang, "The state of desalination and brine production: A global outlook" Science of the Total Environment, (2015).
Meneses, Pasqualino, C'espedes-S'anchez, Castells, "Alternatives for Reducing the Environmental Impact of the Main Residue From a Desalination Plant" Journal of Industrial Ecology, United States, (2010).
Mishra, Veeranna, Kumar,"Engineering bacterial aromatic dioxygenase genes to improve bioremediation" Bioremediation of Pollutants, India.
Oren, "Industrial and environmental applications of halophilic microorganisms" Environmental Technology, Jun. 2010.
Ortiz-Herna'ndeza, Quintero-Ramírez, Nava-Ocampo, Bello-Ramírez, "Study of the mechanism of *Flavobacterium* sp. for hydrolyzing organophosphate pesticides" Fundamental & Clinical Pharmacology, (2003).
Pal, Singh, Soni, Tripathi, Kamle, Tripathi, Kumar, "The role of microorganism in bioremediation for sustainable environment management" Bioremediation of Pollutants, India.
Podevin, Fotidis, Francisci, Møller, Angelidaki, "Detailing the start-up and microalgal growth performance of a full-scale photobioreactor operated with bioindustrial wastewater", Algal Research, (2017).
Qin, Ling, Zhao, Yang, Yin, Guo, Chen, "CRISPR/Cas9 editing genome of extremophile *Halomonas* spp.", (2018).
Rasoulia, Valverde-Péreza, D'Estea, Franciscia, Angelidakia, "Nutrient recovery from industrial wastewater as single cell protein bya co-culture of green microalgae and methanotrophs", Biochemical Engineering Journal, Mar. 2018.
Rosero-Chasoy, Rodríguez-Jasso, Aguilar. Buitr'on, Chairez, Ruiz, "Microbial co-culturing strategies for the production high value compounds, a reliable framework towards sustainable biorefinery implementation—an overview", Bioresource Technology.
Sanghvi, Thanki, Pandey, Singh, "Engineered bacteria for Bioremediation", Bioremediation of Pollutants, India.
Santos, Vieira, Fernandes, Empis and Novais, "Optimisation of the biological treatment of hypersaline wastewater from Dunaliella salina carotenogenesis" Journal of Chemical Technology and Biotechnology, (2001).
Shukla, Sanghi, Goyal, Misra, "Modeling the desalination of saline water by using bacteria and marsh plants", Desalination, May 2011.
Singh, Pandey, Singh, Gani, Yadav, Thanki,, Kumar, "Bioreactor and bioprocess technology for bioremediation of domestic and municipa wastewater" Bioremediation of Pollutants, India.
Wyk, Ham, Kersten, "Potential of supercritical water desalination (SCWD) as zero liquid discharge (ZLD) technology", Desalination, (2020).
D'Este, Alvarado-Morales, Angelidaki, "Laminaria digitata as potential carbon source in heterotrophic microalgae cultivation for the production of fish feed supplement", Algal Research, Jul. 2017.
Jones, Qadir ,Vliet, Smakhtin, Kang, "The state of desalination and brine production: A global outlook" Science of the Total Environment, Dec. 2018.
Oren, "Industrial and environmental applications of halophilic microorganisms" Environmental Technology, (2010).
Podevin, Fotidis, Francisci, Møller, Angelidaki, "Detailing the start-up and microalgal growth performance of a full-scale photobioreactor operated with bioindustrial wastewater", Algal Research,May 2017.

\* cited by examiner

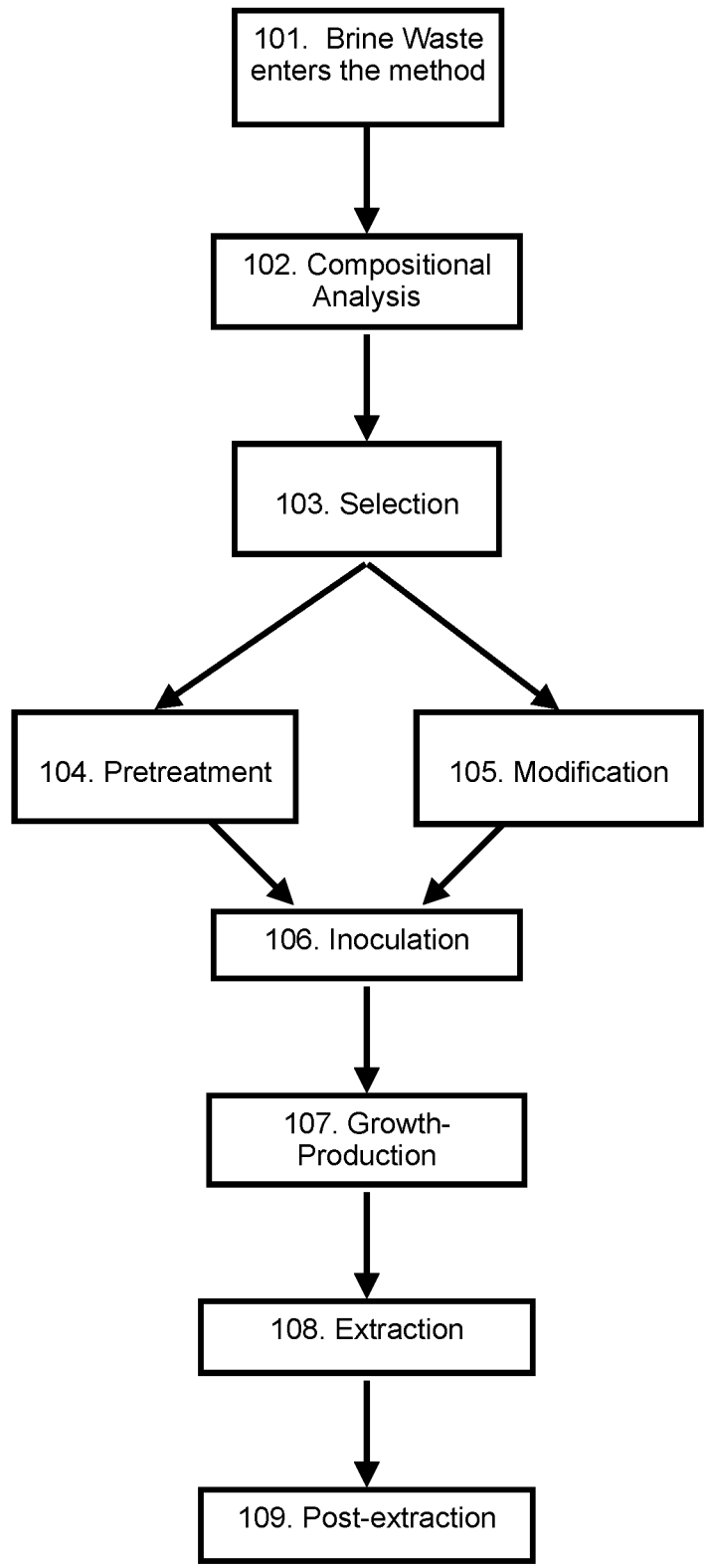

BRINE WASTE MANAGEMENT METHOD UTILIZING GENETICALLY MODIFIED HALOPHILES AS BIO-REFINERIES

CROSS-REFERENCE TO RELATED APPLICATIONS

Not applicable.

REFERENCE TO SEQUENCE LISTING, A TABLE, OR A COMPUTER PROGRAM LISTING COMPACT DISC APPENDIX

Not applicable.

TECHNICAL FIELD

The disclosure is related to techniques of waste management, desalination, and biotechnology. More particularly, embodiments may provide novel means of brine waste management.

BACKGROUND OF INVENTION

Water scarcity is a global issue. Increasingly, the lack of clean, drinkable water is becoming a major source of geo-political tension and human suffering. Additionally, lack of fresh water sources has detrimental effects on agricultural and industrial production. With fresh water sources dwindling, one of the only viable solutions to meet the world's water demand is desalination. The major issues preventing the proliferation of desalination are the cost, energy usage, and environmental impact. A considerable percentage of both the cost and environmental impact is due to brine waste.

Conventionally, methods for brine management involve disposing brine waste into the environment. Due to high salinity and low dissolved oxygen levels, in conjunction with other factors, direct disposal has devastating environmental impact. This problem has been partially addressed by diluting brine waste prior to disposal. Despite dilution, however, negative environmental effects are still a concern. Another attempt of preventing the ecological impact of disposing brine waste has been through boiling it down, conventionally using fossil fuels as an energy source emitting large amounts of carbon dioxide and other potentially harmful compounds contained within the brine waste. Both methods are costly and environmentally damaging.

With conventional methods for brine waste management there is no way of making brine waste management both sustainable and profitable. Therefore, brine waste is a bottleneck preventing desalination from meeting the world's water demand at scale.

Accordingly, need exists for alternative approaches that effectively and efficiently manage brine waste sustainably and profitably.

SUMMARY OF THE EMBODIMENTS

In accordance with the embodiments, a brine waste management method comprises utilization of brine waste as a growth medium for genetically modified halophiles acting as bio-refineries creating predetermined chemicals of value.

Accordingly several advantages of one or more aspects of the embodiments are as follows: to provide a method that improves the sustainability and profitability of desalination, that allows for the global proliferation of desalination to help alleviate water scarcity, that can be used to create chemicals of value for profit, that can produce a plurality of chemicals of value, that can be applied to numerous industrial processes which create brine waste, that can process and bioremediate pollutants, that can be applied in conjunction with convergent lucrative processes, that can reconstitute brine waste to be of use in agricultural and industrial processes, and that can reduce environmental degradation caused by brine waste disposal.

These, and other, advantages of one or more aspects of the embodiments will be better appreciated and understood when considered in conjunction with the following description and the accompanying flowchart. The following description, while indicating various embodiments of the embodiments and specific details thereof, is given by way of illustration and not of limitation. Many substitutions, alterations, additions or rearrangements may be made within the scope of the embodiments, and the embodiments includes all such substitutions, alterations, additions or rearrangements.

BRIEF SUMMARY OF FLOWCHART

FIG. 1 is a flowchart which shows an overview of the phases within an embodiment of the brine waste management method disclosed.

| Drawing - reference numerals | |
|---|---|
| 101 | Brine waste enters the method |
| 102 | Compositional analysis |
| 103 | Selection |
| 104 | Pretreatment |
| 105 | Modification |
| 106 | Inoculation |
| 107 | Growth-Production |
| 108 | Extraction |
| 109 | Post Extraction |

DETAILED DESCRIPTION OF SPECIFIC EMBODIMENTS

FIG. 1 shows an overview of the brine waste management method disclosed. A brine waste enters the method 101 from a brine-producing industrial process, such as desalination, food processing, or industrial manufacturing. The brine waste enters the method 101 to be utilized as a growth medium for genetically modified halophiles acting as bio-refineries creating predetermined chemicals of value. Selection 103 of said halophile species is based on the compositional analysis 102 of the brine waste and the desired chemicals of value. Once the halophile species is selected and their genome undergo modification 105 to express the predetermined output, inoculation 106 of the brine waste growth medium may occur. Prior to inoculation 106, the brine waste may undergo pretreatment 104 to ensure optimal growth-production 107 conditions for the species and chemicals of value selected. After inoculation 106, growth-production 107 are monitored until the adequate conditions for extraction 108 are met, then chemicals of value may be extracted. Following extraction 108 of the chemicals of value, excess brine waste may undergo additional post-extraction 109 processes.

The brine waste management method disclosed is a dynamic process, with embodiments of the embodiments subject to the influence of a plurality of factors. Said factors include, but are not limited too, the chemicals of value selected, the inclusion of bioremediation functionality, the amount of excess brine waste growth medium remaining after extraction 108, composition of excess brine waste growth medium, and the halophile species selected. Thus, many substitutions, alterations, additions or rearrangements may be made within the scope of the embodiments, and the embodiments includes all such substitutions, modifications, alterations or rearrangements.

Brine Waste Used

The brine waste entering the brine waste management method disclosed may come from a variety of sources. These sources may include desalination, food processing, or any other industrial process producing brine waste of NaCl concentrations of approximately 0.6 M NaCl to saturated concentrations of NaCl. In an embodiment, the volume of the brine waste entering the method may be the total amount of brine waste produced by the brine waste producing industrial process, or a fraction there of. When bioremediation functionality is incorporated in an embodiment, some embodiments may split the brine waste, with some batches oriented towards the production of chemicals of value and while other batches may be used for bioremediation of external pollutants and noxious chemicals, as well as the bioremediation of the brine waste itself. In some embodiments, the brine waste may be utilized simultaneously for both the production of chemicals of value and bioremediation, particularly in the embodiments wherein the compounds for bioremediation act as substrates for the predetermined chemicals of value, as may be the case in embodiments involving bioremediation phosphorus and nitrogen based pollutants.

Compositional Analysis and Selection

To ensure the efficacy and efficiency of the brine waste to be used as a growth medium for genetically modified halophiles, the composition and character of the brine waste may be analyzed. As the embodiments may include a wide variety of brine waste producing industrial processes, compositional analysis 102 allows for the particularities of the brine waste used in each embodiment to be adequately addressed. For example, two separate desalination plants may obtain source water from different sources, use different anti-fouling agents, and filter different proportions of source water creating brine waste of different compositional characteristics. Despite the differences in the composition of the brine waste produced from each respective desalination plant, the disclosed brine waste management method will be equally viable, providing compositional analysis 102 is performed and the selection 103 of halophile species is congruent with the characteristics of the brine waste to be used as a growth medium.

Many conventional analytical techniques may be conducted to gain insight into the composition of the brine waste, these techniques may include: spectrophotometry to measure the optical density of dissolved solids, gas chromatography to measure gases, freeze drying biomass samples to conduct further analysis of the macromolecular contents through a plurality of conventional purification and measuring techniques, litmus testing to ascertain ph levels, and titration to determine concentrations of various chemicals of interest, such as anti-foulants added during the industrial processing or common components of the source water used.

Suspected pollutants and noxious chemicals in the brine waste accumulated from its source, such as phenols from industrial brine waste water or boron from desalinated brine waste, may need to be identified through analogous conventional techniques such as high performance liquid chromatography or mass spectrometry.

Compositional analysis 102 of the brine waste may influence the halophile species selected and the pretreatment 104 needed to facilitate bio-refinery functions. The concentration of indigenous microorganisms may also be measured through conventional techniques such as subculturing on differential media, biochemical, metabolic and phenotypic analysis, or nucleic array techniques such as PCR or reverse-transcriptase PCR, nucleotide sequencing, and restriction fragment length polymorphism analysis.

In some embodiments, halophilic microorganisms indigenous to the brine waste may be selected for modification 105 due to their innate compatibility with the composition of the brine waste. However, because the brine waste is a by-product of an industrial process and the source water would likely be of lower NaCl concentrations than the brine waste itself, the presence of ideal halophile species already present within the brine waste would be unlikely. The hostility of the brine waste to most organisms, however, is what allows for the use of halophiles as bio-refineries in unsterile conditions such as the brine waste medium. In many embodiments, non-indigenous halophile species may be selected for their compatibility with the composition of the brine waste, ease of genetic modification 105, and other factors, such as functionality in bioremediation and convergent metabolic pathways associated with the chemicals of value desired. In some embodiments, several comparable species may be inoculated into individual samples of the brine waste and analyzed for growth rates as a metric for compatibility with the brine waste medium.

Given the phylogenetic diversity of halophilic organisms, different species can thrive in vastly different environments. This diversity allows for a wide spectrum of halophile species to be selected for modification 105 based on the compatibility of the composition of the brine waste with the nutritional and environmental requirements of the halophile species. For instance, if the brine waste is near saturated concentrations of NaCl, only extreme halophiles need be considered for modification 105 unless the brine waste is diluted in pretreatment 104. While NaCl concentration is merely one factor, assessment of the compositional characteristics of the brine waste relative to the environmental needs of respective halophile species will be multi-factorial. This is due to the variability of nutritional and environmental needs of respective halophile species. Factors to consider may include nutrient profiles, concentrations and types of dissolved organic material and gases, salinity, ph, and ionic profile. Skilled artisans will appreciate the plurality of factors which may be relevant when selecting a halophile species, as well as the plurality of conventional techniques which may be used to perform a relevant compositional analysis 102 of the brine waste.

Pretreatment

Pretreatment 104 prepares the brine waste to be used as a growth medium for cultures of genetically modified halophiles. Pretreatment 104 of brine waste may include neutralizing anti-fouling agents that may hinder growth of the genetically modified halophiles, adding substrates or nutrients to encourage growth of genetically modified halophiles, moving the brine waste, adjusting NaCl concentrations, filtering the brine waste, and any other such treatments meant to encourage growth and prevent hinderances to growth.

Anti-fouling agents include any and all additions to the water added during the brine waste producing industrial process meant to minimize microbial growth or fouling. Common anti-fouling practices include changes in temperature, changes in ph, and the use of chemical anti-foulant practices, such as chlorination.

Temperature would need to be optimized for the halophile species selected for inoculation 106, which for halophilic microorganisms may be between approximately 30 and 80 degrees celsius. This may be accomplished by heating or cooling the brine waste prior to inoculation 106. Methods of heating or cooling may vary from simply allowing the brine to cool down or through the application of heating or cooling sources. For instance, one embodiment may include containers with pipes containing heated or cooled water flowing adjacent to containers to regulate temperature.

For ph, conventional acidic, basic, or buffering treatments may be applied to create the ideal ph for the halophile species selected for inoculation 106. Ascertaining the specific acidic or basic molecules content within the brine waste may be obtained through titration of the brine waste during compositional analysis 102. Many halophiles are alkaliphilic, requiring high ph levels, generally above 8.5, to grow optimally. Specific ph levels, however, are to be ascertained after specific species are selected for genetic modification 105 and inoculation 106.

Finally, chemical anti-foulants may need to be neutralized. For instance, a common chemical anti-foulant practice in desalination plants is chlorination, which produces hypochlorous acid and hypochlorite ions in the brine waste. In an embodiment with hypochlorous acid and hypochlorite ions present, the anti-foulants may be neutralized through the addition of sulfite salts, specifically sodium sulfate, sodium bisulfite, or sodium metabisulfite.

Skilled artisans would appreciate that a plurality of conventional techniques may be used to neutralize a plurality of anti-foulants. Examples were given of the most common anti-foulants to be used in many of the embodiments. Each embodiment may address the particularities of the respective anti-foulants used and the halophile species selected to optimize conditions for growth-production 107 for said halophile species.

Addition of substrates during pretreatment 104 may depend on the composition of brine waste and the nutritional requirements of the halophile species selected, as well as the needed substrates for the genetically modified halophiles to act as bio-refineries for predetermined chemicals of value. To offset potential compositional lacking of the brine waste, additional substrate may be added during the pretreatment 104. Additional substrates may include, but are not limited to: ions or minerals (such as magnesium and potassium), relevant enzymes and their precursors, nutrients (glucose, glycerol, and other organic material) and any other additions that would aid the predetermined cultures of genetically modified halophiles to grow and produce the desired chemicals of value. Compositional analysis 102 and selection 103 of the halophile species will determine the particular set of substrates that need to be added in each embodiment. For instance, if the brine waste in an embodiment is lacking in organic material to be used as an energy source by the genetically modified halophile species, such lacking may be addressed through the addition of organic energy sources depending on the needs of the halophile species. Due to the hostility of the highly saline brine waste medium, non-sterile sources such as food waste may be used in some embodiments to cut costs with minimal impact on production or yield of the chemicals of value.

In some embodiments where the genetically modified halophiles are used in the bioremediation of external pollutants and noxious chemicals not produced by the brine waste producing industrial process, such pollutants and noxious chemicals may be added during pretreatment 104. They may also be added during growth-production 107 into the brine waste medium, or during post-extraction 109 into the excess brine waste left over after extraction 108, as will be discussed in later sections. Levels of the pollutants and noxious chemicals added may vary. For instance, if an embodiment is within close proximity of coal or metal mining operations producing pollution in the form of ionic mercury, toxic to both humans and the environment, bioremediation of the mercurial waste may be included within the embodiment to be sold as a service for profit while lowering overall environmental degradation. In such an embodiment, the selected halophile species may be modified to express the mer operon genes merA, merT, and merP, isolated from *Bacillus thuringiensis* PW-05 using conventional techniques, as will be discussed in the next section. The mer operon genes allow the genetically modified halophile species to reduce ionic mercury to elemental mercury, a less toxic variant. In such an embodiment concentrations of mercury may be added during pretreatment 104 of growth-production 107, but at no point should not exceed 50 ppm so as not hinder growth and production of the genetically modified halophile.

Filtration of the brine waste prior to inoculation 106 is dependent on the composition of the brine waste used. For instance, solids that may interfere with the extraction 108 process may be filtered out using mesh filters of predetermined sizes based on the extraction 108 techniques used. In some embodiments decontamination of competitive microorganisms prior to inoculation 106 of the genetically modified halophiles may occur via decontamination protocols such as UV light treatment. However, due to the high salinity of brine waste and the likely presence of anti-fouling agents, the presence of competitive microorganisms in high concentrations is unlikely.

Finally, pretreatment 104 may include any additional treatment which would otherwise minimize hinderances to growth and encourage the growth of the genetically modified halophile species. In some embodiments, such additional treatments may include aeration, as oxygen is likely to be in depleted concentrations, additional source water added to dilute NaCl concentrations or additional added NaCl to increase concentrations. Pretreatment 104 may also include the movement of the brine waste from, whether in a continuous flow or sequenced batching. Movement of the brine waste may be dependent on the structure and dimensions of the embodiment, but most movement can be achieved through conventional use of hydraulic pumps if any pressure differential need be overcome. Any other alterations or additions which may aid in the growth and function of the genetically modified halophiles, with such alterations or additions in the embodiments being dependent on the compositional analysis 102 of the brine waste and the selection 103 of halophile species and desired chemicals of value may occur during pretreatment 104.

Modification and Inoculation

As aforementioned, selection 103 of the halophile species is dependent on the composition of the brine waste, the desired chemicals of value and the viability of the halophile species selected for to facilitate the metabolic pathways needed for the production of the chemicals of value desired. Modification 105 involves the genetic alteration of the halophile species selected to express the desired chemicals of value, or precursors there of. Additionally, modification 105 may include alterations which facilitate bioremediation functionality, increase the expression of naturally present metabolic pathways related to the production of valuable chemicals, and to promote overall efficiency in growth-production 107 and extraction 108. Selection 103 of the chemical of value and the halophile species desired will therefore influence the techniques and gene sequences which may be used during modification 105.

For instance, if the desired chemical of value in an embodiment were to be polyhydroxyalkanoates (PHAs) for the purpose using the biopolymers to make plastic water bottles, *Halomonas* bluephagenesis, a known chassis for Next. Generation Industrial Biotechnology, may be a suitable species to select providing the composition of the brine waste is compatible with the species. Transferring of gene such as phaC, phaA, and phaB into the genome *Halomonas* bluephagenesis would cause an expression PHA synthase, 3-ketothiolase, and acetoacetyl-CoA reductase, respectively, turning the genetically modified *Halomonas* bluephagenesis into an effective bio-refinery which could be inoculated into the brine waste growth medium. Further modification 105 involving the deletion of the 2-methylcitrate synthase gene, prpC, would increase production of a PHA called poly-3-hydroxybutyrate-co-3-hydroxyvalerate (PHBV) by preventing proprionyl-CoA from the methyl citrate cycle, allowing it to be converted by 3-ketothiolase, acetoacetyl-CoA reductase, and PHA synthase into PHBV. Many such genetic alterations are possible. Such modification 105 in an embodiment may be achieved through conventional genetic modification techniques involving the CRISPR-Cas9 system, in which an endonuclease, Cas9, is guided by clustered regularly interspaced short palindromic repeats originating from microbial immune systems to targeted genomic loci using Watson-Crick base pairing.

Alternatively, if dissolved oxygen levels of the brine waste are too low for the aerobic *Halomonas* bluephagenesis, a photosynthetic halophile, such as *Haloferax mediterranei*, could also be used to produce PHAs. Such an embodiment may utilize similar conventional techniques of the CRISPR-cas9 system aforementioned or cell to cell conjugative transfer. In the case of the selection 103 of a photosynthetic halophile, incorporating light sources or translucent sections in the containers to support the functioning of such organisms may be needed.

Some embodiments may involve more than one species to create a symbiotic co-culture of halophiles. For instance, in the case of low dissolved oxygen levels, an anaerobic halophile species may be selected to increase the dissolved oxygen level, such as the halophilic algae *Dunaliella salina*. While an additional aerobic *Halophile*, such as *Halomonas maura*, may be added to symbiotically intake dissolved oxygen while acting as a bio-refinery. In an embodiment utilizing this combination of *Dunaliella salina* and *Halomonas maura*, *Halomonas maura* could be used for its proclivity to develop exopolysaccharides and altered to make an array of immuno-modulators for pharmaceutical purposes. Alternatively or simultaneously, *Dunaliella salina*'s ability to create beta-carotenoids can be additionally exploited by up-regulating expression of genetic material related to beta-carotene production. Such up-regulation may be achieved through conventional techniques utilizing CRISPR-Cas transcriptional activation or CRISPRa.

In some embodiments, multiple halophile species could be selected, with each producing an intermediate to the chemical of value desired, creating a complex of bio-refineries working symbiotically. Alternatively, some embodiments may include the production of a plurality of chemicals of value each produced by one or more halophile species either in a symbiotic complex or independently of each other.

Some modification 105 may not be directly related to the production of the chemicals of value, but rather to increases in efficiency. In some embodiments, the halophile species may be modified to express minCD genes in order to express a cell-elongation cassette, thereby increasing its cell length up to 100 times. This modification, while it may not directly effect production of the a predetermined chemical of value, will likely increase yield during extraction 108 by making it easier to extract the genetically modified halophiles and their intracellular products from the brine waste medium. In some embodiments, addition or up-regulation of genetic material coding for enzymes increasing the ability to digest organic material, such as the amyL isolated from *Bacillus licheniformis*, a gene coding for amylase, may be required to assist the halophile species in utilizing the organic material for energy.

Given the current availability and efficacy of techniques for altering, adding, and deleting targeted gene sequences, an array of halophile species and chemicals of value may be selected. Examples given are by no means exhaustive and the breadth of applicability allows for a dynamic system of bio-refineries that can change based on desired outcomes through the inoculation 106 of differently genetically modified halophiles to produce alternative chemicals of value. Embodiments may include many different halophile species and chemicals of value, offering the ability of the brine waste management method disclosed to provide regionally specific chemicals of value, whether they be for agricultural, pharmaceutical, industrial or other uses. Additionally, specific protocols for genetically modifying the selected halophile are meant to be illustrative and other conventional techniques of genetic modification may be used, such as molecular cloning or guided evolution, may be used in some embodiments.

Once the halophile species is selected and genetically engineered for purpose, cultivation in a growth medium on an agar growth plate may be needed prior to inoculation 106 of the brine waste. Cultivation may involve growing the cultures in sterile, nutrient dense solutions on agar growth plates in conditions suitable for the specific halophile species selected. In some embodiments, incubating the agar growth plates may take between approximately 8 hours to 10 days depending on numerous factors including but not limited to the species selected, its replication rate, the desired number of halophiles based on the volume of brine waste being processed, and the conditions available in the lab producing the culture. In an embodiment using more than one halophile species, separate agar growth plates may be created and kept separate until inoculation 106.

The culture may be harvested by centrifugation, resuspended in the a sterile NaCl solution, with NaCl concentrations ranging from approximately 0.5 M NaCL to saturation depending on the species selected. The suspended solution may then be kept at the optimum temperature for the genetically modified halophiles, generally between 30 and 80 degrees celsius. In some embodiments, additional nutrients specific to the halophile species selected may be included in the suspended solution. Once the suspended solution is transported to the brine waste medium, inoculation 106 may occur.

The cultures of genetically modified halophiles would then be inoculated into the brine waste by pouring the suspended solution into the brine waste. In some embodiments involving the co-culturing of species, separate suspended solutions may be entered at different intervals or different containers to later be conjoined or mixed. For instance, in embodiments pairing anaerobic and aerobic halophiles, anaerobic halophiles could be introduced first, and after periodic monitoring of dissolved oxygen levels, aerobic halophiles could be introduced once the optimal oxygen level for that species is reached. Such would be the case of the aforementioned example of the symbiotic co-culture of *Dunaliella salina* and *Halomonas maura*. To ensure even distribution, in some embodiments the suspended solution may be poured in at multiple locations in the brine waste. Additionally, alternating, periodic inoculation 106 of additional cultures of each species may be required to maintain a predetermined equilibrium.

Growth-Production

Growth-production 107 involves monitoring growth and production of genetically modified halophiles in their function as bio-refineries. A plurality of metrics may be monitored to ensure optimal growth-production 107, which may include: concentration of the genetically modified halophile cultures, illustrating the levels of growth which would in turn be used to determine if any additional changes need to be made in the medium to encourage growth; concentration of gasses, particularly oxygen due to its importance in the growth of certain halophiles and to minimize the explosive potential of excess amounts of highly flammable oxygen gas, as well as methane for its similarly combustable nature; nutrient/substrate levels, such as the concentration of organic material, ions, enzymes, or NaCl concentration to ensure the optimal environment for the genetically modified halophiles to act as bio-refineries; concentrations of desired chemicals of value, to indicate when to begin extraction 108, concentrations of which depend on the chemical of value chosen and the saturation point of the chemical of value.

In an embodiment, monitoring each metric may include a periodic sampling and analysis, similar to the conventional techniques used in the initial compositional analysis 102 of the brine waste. A means for collecting samples, such as a valve providing an opening in the container or containers in which the brine waste management method disclosed occurs, may be needed in some embodiments.

Alternatively or synchronously with periodic sampling, some embodiments may contain monitors within the containers. The type and number of monitors is dependent on each metric monitored and the scale of brine waste being managed in each embodiment. An embodiment may include monitors measuring methane and oxygen levels, temperature, ph, and other relevant metrics to the growth-production 107 of the predetermined cultures of genetically-modified halophiles.

For example, one embodiment may include daily sampling, with optical density of the biomass measured spectrophotometrically, targeted gene expression levels measured using conventional reverse-transcriptase-PCR protocols, as well as constant monitoring of gas concentrations using any conventional gas detector capable of measuring multiple gases, such as oxygen, carbon dioxide, methane, or hydrogen sulfide, as well as their LEL levels. Concentrations of chemicals of value may be measured by a plurality of conventional techniques depending on the molecular characteristics of the chemicals of value, such as polarity, size, solubility, chemical structure, and other unique characteristics of the chemicals of value that may impact choice of sample analysis.

Additionally, if interventions or additions are needed to facilitate the growth-production 107 process, such as temperature regulation, ph regulation, and adding additional substrates, they may be done in concurrence with the requirements of the halophile species selected, the composition of brine waste, and any other aspect that may impact growth-production 107.

Extraction

Extraction 108 involves extracting valuable chemicals produced and processed by genetically modified halophiles. In addition to the chemicals of value produced by the genetically modified halophiles, extraction 108 and post-extraction 109 include the extraction of any and all materials from the brine waste medium. In some embodiments, these additional extractable materials for profit may include organic material, minerals, salts, water, and/or the less toxic products of bioremediated compounds.

A plurality of conventional extraction 108 techniques may be used based on the specific chemicals chosen, the volume processed, and the tools available. In some embodiments the extraction 108 may include a sedimentation period of approximately one to three hours to allow for separation and processing of the liquids and solids. Some embodiments may separate the brine waste medium into multiple batches or evaporation ponds while some embodiments may process the brine waste medium continually.

Yield may vary depending on a number of factors, including the chemicals of value extracted, the methods of extraction 108, the efficiency of genetically modified halophiles as bio-refineries, and the amount of brine waste processed in each embodiment.

One particularly effective mode of extraction 108 in many embodiments may be the use of industrial centrifuges to harvest the desired chemicals of value. The number and type of industrial centrifuges is dependent on the needs and scale of the plant utilizing the brine waste management process disclosed and the chemicals of value desired to be extracted. The industrial centrifuges may be used to extract any and all chemicals of value from the brine waste, including the following non-exhaustive list of chemicals of value: pharmaceuticals, biofuels, biopolymers, organic material, minerals, vitamins, precursors thereof, and other compounds with market value. RPM of the centrifugation, as well as time of centrifugation, may be determined based on the chemicals of value to be extracted, as well as the volume processed. Alternatively, in some embodiments, dehydration of the brine waste and additional purification and isolation of the chemicals of value may be done through a conventional purification techniques dependent on the specific chemicals of value selected.

After isolation, the chemicals of value may be stored or additionally processed, then sold for profit or transferred to a conjoined industrial process.

For example, if the population of a region were susceptible to a particular malady, the chemical of value selected in a related embodiment may be a pharmaceutical treatment for said malady. For instance, with a population susceptible to skin cancers and UV light radiation damage, the chemical of value selected for may be Mycosporine-like amino acids, such as *Porphyra*-334 or mycosporine-glycine, which have cyclohexenone or cyclohexenimine conjugated arrangements that have the ability of absorbing UV light and protecting skin from damage. Said Mycosporine-like amino acids may either be processed in a conjoined industrial process into a distributable and safe form to be sold directly to regional markets or the raw chemical can sold to pharmaceutical or cosmetic plants for additional processing and distribution. Thus, if such an embodiment were to be coupled with a local desalination plant, it may help lower the cost of the pharmaceutical or cosmetic products while also counterbalancing out the costs of providing drinkable water for the populace.

If, in another embodiment, a desalination plant wanted to use the brine waste management method disclosed to produce PHA plastics in order to create biodegradable plastic water bottles to bottle the desalinated water, the processes could be coupled, decreasing costs and increasing efficiency of production. Another embodiment could couple the brine waste management method with a food processing plant and select a chemical of value for the processes particular to that plant, potentially lowering operation costs.

In addition to the extraction 108 of the chemicals of value produced by the halophile species, other components of the brine waste may be extracted and capitalized upon in post-extraction 109 processes. Extracted minerals, for example, may be used to remineralize desalinated water, a common stage in desalination that conventionally requires the outside purchase of minerals. This may further mitigate costs of desalination. The halophile species can also be further exploited by running the biomass through conventional autoclaving techniques, then extracting macromolecules through centrifugation at approximately 6000 rpm for an amount of time relative to the amounts being processed. The macromolecular content can then be sold as feed, along with other organic material within in the brine waste. Alternatively, in the case of certain species, such as the aforementioned *Dunaliella salina*, conventional techniques of catalytic hydrolysis may provide the raw material for biofuel production in addition to the chemicals of value engineered for.

Additionally, excess brine waste after the chemicals of value have been extracted can be disposed of in a number of ways in post-extraction 109, which may include: being dehydrated and sold as biomass, reintroduced to the environment after eradicating all cultures of the genetically modified halophiles, used for agricultural or industrial practices, used for additional bioremediation, or reintroduced as additional growth medium in the method disclosed.

In the case of dehydration of the excess brine waste, in an embodiment, biomass may be collected through transferring the excess brine waste to evaporation ponds, then collecting the non-evaporated material. Contents of the non-evaporated material may then be analyzed through conventional techniques, as those aforementioned regarding macromolecular concentrations. left over biomass may then be sold or discarded depending on the market value of its contents.

If the excess brine waste was to be reintroduced to the environment, it would be pertinent to ensure that all genetically modified halophile cultures were eliminated to prevent their proliferation in the environment. This may be done through a number of ways, including but not limited to: genetically engineering weaknesses, such as the lack of ability to produce a predetermined enzyme, and exploiting it by ceasing supplementation of said enzyme; utilizing UV light treatment; utilizing extreme temperature or ph levels non-compatible with the halophile species; and utilizing other chemical means of targeting the genetically modified halophiles. A combination of these and other conventional decontamination techniques may be used to prevent the introduction of genetically modified halophiles from entering the environment. If a genetic weakness were to be engineered, such weakness must be managed during pretreatment 104, modification 105, inoculation 106, and growth-production 107. For instance, In an embodiment in which a lack of an enzyme is engineered, said enzyme may need to be added and monitored to ensure the proliferation and functioning of the genetically modified halophiles.

Similarly, in the case of utilizing excess brine waste being sent for use in other industrial or agricultural processes, the excess brine waste may undergo decontamination of the genetically modified halophiles. After decontamination, the excess brine waste may be transferred to convergent processes depending on the composition of the excess brine waste which may require additional compositional analysis 102 prior to determining its suitability to a plurality of industries which may utilize the excess brine waste.

Excess brine waste may also be used for additional bioremediation of external pollutants as well as undergoing bioremediation of already present pollutants before being reintroduced to the environment. In some embodiments, pollutants and noxious chemicals may be additionally processed in the excess brine waste. In some embodiments, new halophile species may be inoculated to accomplish the bioremediation of the external pollutants and noxious chemicals following the same progression of compositional analysis 102, selection 103, pretreatment 104, modification 105, inoculation 106, growth-production 107, and extraction 108. In such embodiments, the chemical of value would be a neutralized version of the pollutants and noxious chemicals. This may be done with excess brine waste, with the original brine waste from the brine waste producing process, or a combination thereof. An example of such bioremediation can be seen in the inclusion of the mer operon genes merA, merT, and merP, isolated from *Bacillus thuringiensis* PW-05 explored in the Pretreatment 104 section. Bioremediation is an example of an additional means of generating profit and mitigating environmental degradation offered by the brine waste management method disclosed.

Finally, depending on the condition, composition, and volume of the excess brine waste and the genetically modified halophile species, reintroduction of the excess brine waste into an earlier phase of the brine management system disclosed may occur. Thereby recycling the surviving cultures back to act again as bio-refineries for the chemicals of value desired. Such an embodiment may be favored when a fraction of the brine waste produced by the brine waste producing industrial process is used. In such an embodiment, the profits generated from the brine waste management disclosed can be directed to treating the brine waste not used for the production of chemicals of value in preparation for disposal in a more environmentally sustainable way, which may include increasing dissolved oxygen levels and diluting the brine, as well as neutralizing any harmful anti-foulants akin to the processes in the pretreatment 104, bioremediation, and other such practices which may prepare the brine waste for disposal while mitigating environmental damage.

Materials

In congruence with the dynamism of the brine waste management method disclosed, a plurality of materials may be used in the embodiments. All and any containers, tanks, pipes, centrifuges, and other structural components used during the brine management process may be made out of a plurality of materials. Materials used for the containers may include but are not limited to metals, such as stainless steel or titanium, technical glass, and/or any other materials capable of sustaining the erosive tendencies of the highly saline brine waste. The structure, dimensions, and materials used for the used in the embodiments, may be proportional to the volume of brine waste managed.

Any biomaterials, chemicals, lab equipment, measuring devices, reference texts, machinery, or other materials used in an embodiment will be dependent on a number of factors which may include the chosen techniques used in compositional analysis 102, selection, 103, pretreatment 104, modification 105, inoculation 106, growth-production 107, extraction 108, and post-extraction 109, as well as the desired chemicals value and the needs of the halophile species selected.

CONCLUSION, RAMIFICATIONS, AND SCOPE

Thus, the reader will see that the embodiments of the brine waste management method disclosed provide a dynamic process by which chemicals of value may be created, and sold, from brine waste utilizing genetically modified halophiles acting as bio-refineries. Thereby transforming brine waste from a toxic effluent to a valuable resource to be exploited.

The implications of several embodiments are numerous, including the potential lessening of global water scarcity through the increased viability of desalination and the transformation of brine management from a costly necessity to a lucrative enterprise. Additionally, embodiments may involve a plurality of brine waste-producing industrial processes and be applied to create value from waste and bioremediate the harmful byproducts of other industrial processes.

While the above description contains many specificities, these should not be construed as limitations on the scope of the embodiments. Many variations are possible. Additionally, it must also be emphasized that all species, genetic material, and analytical techniques mentioned are for illustrative purposes to show the breadth of applicability and dynamism of the brine waste management method disclosed and are by no means meant to be exhaustive nor particularly novel. Rather, it is method of utilizing the brine waste as a medium for the genetically modified halophiles to create chemicals of value detailed in the specification that presents a novel methodology capable of transforming brine waste management into a lucrative and sustainable enterprise.

Accordingly, the scope of the disclosure should be determined not by the embodiments illustrated, but by the appended claims and their legal equivalents.

Glossary

Anti-foulants: substances and techniques used to prevent microbial growth.

Bio-refinery: organism capable of producing bio-compounds of interest and/or capable of bioremediation.

Bioremediation: the neutralization of compounds that are harmful to the environment and/or health.

Brine waste: wastewater with high salinity.

Brine waste producing industrial process: any process producing brine waste.

Brine waste management: any and all processes involving the handling, discarding, alteration, or use of brine waste.

Chemicals of value: any chemical or assortment of chemicals that has market value or predetermined value, also including neutralized, less-toxic forms of pollutants processed.

Chemicals of interest: any chemical that may be of interest when performing analytical techniques, particularly those which may influence the growth and production of predetermined cultures of genetically modified halophiles.

Excess brine waste: brine waste left over after the extraction of chemicals of value.

Genetically modified halophiles: organisms capable of thriving in environments of high salinity which have been genetically modified.

*Halophile*: organism which thrive in solutions of high NaCl concentrations.

Pollutants and noxious chemicals: compounds that are harmful to the environment and/or health.

What is claimed:

1. A method for brine waste management, said method comprising;
   a. pretreating a brine waste to be used as a growth medium for a predetermined culture of genetically modified halophiles;
   b. inoculating said brine waste with said predetermined culture of genetically modified halophiles;
   c. utilizing said brine waste growth medium for said predetermined culture of genetically modified halophiles to act as bio-refineries producing a predetermined chemical of value;
   d. monitoring growth and production of said predetermined culture of genetically modified halophiles as bio-refineries;
   e. extracting said predetermined chemical of value produced by said predetermined culture of genetically modified halophiles;
   whereby said brine waste creates value, transforming brine waste management from a cost sink with environmentally devastating effects into a sustainable and profitable enterprise.

2. The method of claim 1 further including disposal of excess brine waste after said chemical of value has been extracted from said brine waste, excess brine waste is dehydrated and sold as biomass, reintroduced to environments after eradicating all cultures of the genetically modified halophiles, transferred for agricultural or industrial uses, or reintroduced as additional growth medium during pretreatment of said brine waste in method of claim 1.

3. The method in claim 1 wherein said predetermined culture of genetically modified halophiles consists of one or more species of predetermined genetically modified halophiles.

4. The method in claim 1 further involving compositional analysis of said brine waste expected to be used as growth medium.

5. The method in claim 1 wherein said pretreating further involving neutralizing anti-foulants within in said brine waste.

6. The method in claim 1 wherein said pretreating further involving addition of substrates and other nutrients needed by said predetermined culture of genetically modified halophiles to act as bio-refineries to produce said chemical of value or chemicals of value.

7. The method in claim 1 wherein an anaerobic species is included in said predetermined culture of genetically modified halophiles as a means of increasing dissolved oxygen levels.

8. The method in claim 1 wherein said monitoring of growth and production includes monitoring a concentration of gases, concentrations of predetermined genetically modified halophiles, concentration of said predetermined chemical of value, concentrations of dissolved matter, concentrations of minerals, temperature, pressure, and volume of said brine waste.

9. The method in claim 1 wherein extraction of said chemical of value from said brine waste comprises industrial centrifuges.

10. The method of claim 1 further including a predetermined engineered weakness within said predetermined culture of genetically modified halophiles as a means of controlling the growth and post-extraction decontamination of said brine waste of said predetermined culture of genetically modified halophiles.

11. The method in claim 1 further including remineralization of desalinated water with minerals extracted during said extracting of a chemical of value.

12. The method in claim 1 further including any and all chemicals of value produced by predetermined genetically modified halophiles, including both those chemicals of value produced due to the genetic modification of said predetermined culture of genetically modified halophiles and those chemicals of value that are not a direct result of genetic modification.

13. The method of claim 1 further including extraction of any and all matter involved in the method.

14. The method of claim 1 further comprising complex bio-refineries consisting of multiple species of genetically modified halophiles.

15. The method of claim 1 further involving bioremediation of external sources pollutants and noxious chemicals in said brine waste.

16. The method of claim 1 further comprising genetically modified halophiles to prepare brine waste for reentry into an environment.

17. The method of claim 1 wherein the said predetermined culture genetically modified halophiles produce more than one predetermined chemical of value.

18. The method of claim 1 further involving bioremediation of the brine waste by said predetermined culture of genetically modified halophiles.

* * * * *